United States Patent
Lee et al.

(10) Patent No.: US 9,295,085 B2
(45) Date of Patent: Mar. 22, 2016

(54) COMMUNICATION SYSTEM AND METHOD OF DATA TRANSMISSION FOR A MEDIUM ACCESS CONTROL LAYER

(71) Applicant: Intel Corporation, Santa Clara, CA (US)

(72) Inventors: Anthony Lee, San Diego, CA (US); Guotong Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 116 days.

(21) Appl. No.: 14/054,302

(22) Filed: Oct. 15, 2013

(65) Prior Publication Data

US 2014/0105137 A1   Apr. 17, 2014

Related U.S. Application Data

(60) Provisional application No. 61/713,709, filed on Oct. 15, 2012, provisional application No. 61/714,294, filed on Oct. 16, 2012.

(51) Int. Cl.
*H04W 74/08*  (2009.01)

(52) U.S. Cl.
CPC .................. *H04W 74/0866* (2013.01)

(58) Field of Classification Search
None
See application file for complete search history.

(56) References Cited

U.S. PATENT DOCUMENTS

| | | | |
|---|---|---|---|
| 2004/0242231 A1* | 12/2004 | Tang et al. | 455/434 |
| 2005/0020213 A1* | 1/2005 | Azman et al. | 455/67.11 |
| 2008/0049706 A1* | 2/2008 | Khandekar et al. | 370/342 |
| 2012/0189072 A1* | 7/2012 | Tzannes | H04L 27/2613 375/260 |
| 2013/0128809 A1* | 5/2013 | Wentink et al. | 370/328 |
| 2013/0268820 A1* | 10/2013 | Sun et al. | 714/748 |

* cited by examiner

*Primary Examiner* — Brian Roberts
(74) *Attorney, Agent, or Firm* — Forefront IP Lawgroup, PLLC

(57) ABSTRACT

Communication system and method of data communication are provided. The method of data communication for a MAC layer includes initiating an access attempt; transmitting, by a mobile station, a probe to a base station (BS), wherein the probe includes header information and data frames; decoding the header information and the data frames; generating, by the BS, a SACK message; and transmitting the SACK message to the MS.

18 Claims, 4 Drawing Sheets

COMMUNICATION SYSTEM AND METHOD OF DATA TRANSMISSION FOR A MEDIUM ACCESS CONTROL LAYER

CROSS REFERENCE TO RELATED APPLICATIONS

This Application claims priority of U.S. Provisional Patent Application No. 61/713,709, filed on Oct. 15, 2012 and No. 61/714,294, filed on Oct. 16, 2012, the entirety of which is incorporated by reference herein.

BACKGROUND OF THE INVENTION

1. Field of the Invention

The invention generally relates to the data communication for Selective Acknowledgement (SACK) operation, and more particularly, to design the header in the Medium Access Control (MAC) layer for transmitting data.

2. Description of the Related Art

In the current SACK scheme, the base station may send back a SACK Order over F-PCH to indicate the mobile station which frames should be retransmitted. Thus, it's very important for the base station side to know the total number of Reverse-Enhanced Access Channel (R-EACH) data frames in the message and the mobile station address information, so that the base station can set the SELECTIVE_ACK_BIT_MASK properly and the SACK Order can be delivered over a paging channel.

But according to Link Access control (LAC) layer specifications, the current SACK scheme may meet some problems. At the mobile station side, when sending a message, the Segmentation and Reassembly (SAR) sub-layer adds a header to indicate the length of the encapsulated Protocol Data Unit (PDU), and the header will be sent in the first frame. The parameter MSG_LENGTH indicates the length of the encapsulated PDU. However, at the base station side, the LAC layer doesn't know how many R-EACH data frames are sent in the probe even if SAR sub-layer receives the first frame because the R-EACH data rate information is not delivered to the SAR sub-layer through the primitive MAC-Data Indication, such as channel_id, channel_type, data, size, system_time, physical_channel_id.

In addition, in the mobile station, when sending a message, the Addressing sub-layer adds the information of the mobile station identification. Since the SACK Order is delivered over the paging channel, the mobile station's address information is very important. However currently, in the base station side, the SAR sub-layer doesn't allow the PDU frame to be passed to upper layers. Only if the encapsulated PDU passes the Cyclic Redundancy Check (CRC), the PDU is delivered to upper layers. This means that according to the current spec, only after the SAR sub-layer gets a valid PDU, the mobile station's address information can be obtained. But if a valid PDU is received, it means all data frames are received correctly and there is no need to send the SACK Order.

In addition, lower data rates are introduced for R-EACH in the Rev F standard. This can make it more difficulties to get the message length and mobile address information. According to Table 2.1.3.5.2-1 of C.S0002, in Rev F, the minimum number of information bits in one R-EACH data frame is just 16 bits, which corresponds to the rate of 1.5 kbps This means that the first data frame (or frame) might be not enough to carry the message length and mobile station address information. For a rate of 1.5 kbps rate, one data frame is not even enough for the message length information. According to Section 2.1.1.5 in C.S0004, for R-EACH, the message length information plus SI bits will be 2(SI)+1(EXT_MSG_LENGTH)+7 or 15(MSG_LENGTH), which is 10 or 18 bits. Thus it is difficult for the base station side to know how many frames are enough to get the message length and address information.

BRIEF SUMMARY OF THE INVENTION

Communication system and method of data communication for a MAC layer are provided to overcome the problems mentioned above.

An embodiment of the invention provides a method of data communication for a MAC layer, including: initiating an access attempt; transmitting, by a mobile station, a probe to a base station (BS), wherein the probe includes header information and data frames; decoding the header information and the data frames; generating, by the BS, a SACK message; and transmitting the SACK message to the MS.

An embodiment of the invention provides a communication system, comprising: a base station (BS), configured to decode header information and data frames for generating a SACK message; and a mobile station (MS), configured to initiate an access attempt and transmit a probe to the BS, wherein the probe includes the header information and the data frames.

An embodiment of the invention provides a mobile station, comprising: a processor, configured to initiate an access attempt; a transmitter, configured to transmit a probe to an BS, wherein the probe includes the header information and the data frames; and a receiver, configured to receive a SACK message from the BS.

An embodiment of the invention provides a base station, comprising: a receiver, configured to receive a probe from an MS, wherein the probe includes header information and data frames; a decoder, configured to decode the header information and the data frames for generating a SACK message; and a transmitter, transmitting the SACK message to the MS.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
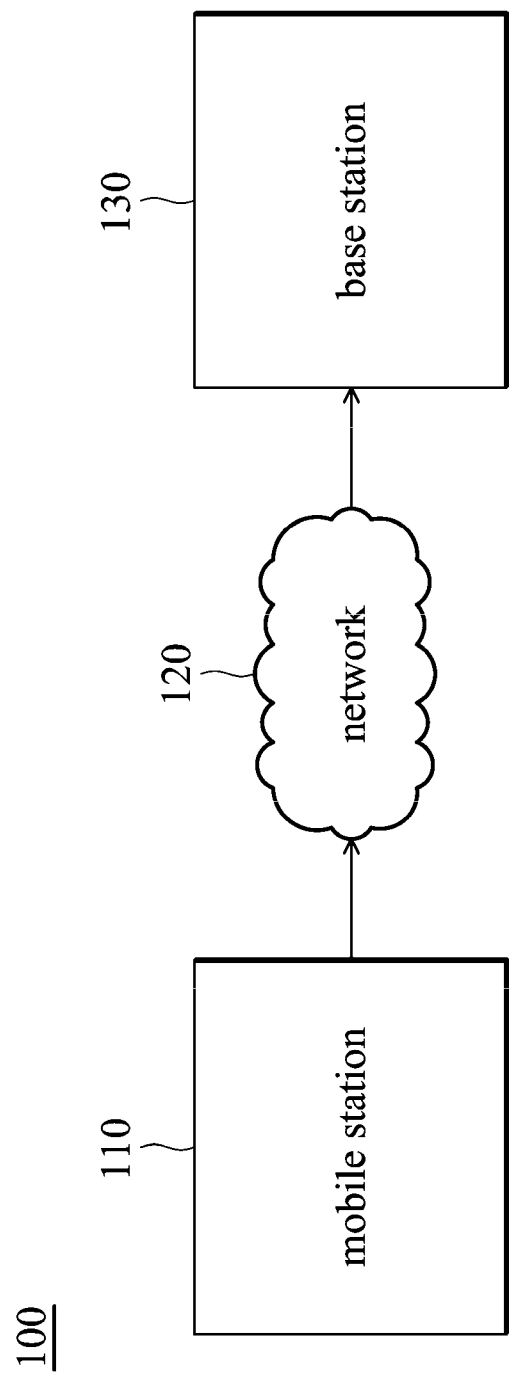
FIG. 1 is a block diagram of a communication system 100 according to an embodiment of the invention.

FIG. 1 is a block diagram of a communication system 100 according to an embodiment of the invention. The communication system 100 includes a mobile station (MS) 110, a network 120, and a base station 130.

Various embodiments are described herein in connection with the MS 110. A mobile station can refer to a device or user equipment (UE) providing voice and/or data connectivity to a user. The MS 110 can be connected to a computing device such as a laptop computer or desktop computer, or it can be a self-contained device such as a personal digital assistant (PDA). The MS 110 can also be called a system, subscriber unit, subscriber station, mobile station, mobile, remote station, access point, remote terminal, access terminal, user terminal, user agent, or user device. The MS 110 can be a subscriber station, wireless device, cellular telephone, PCS telephone, cordless telephone, Session Initiation Protocol (SIP) phone, wireless local loop (WLL) station, personal digital assistant (PDA), handheld device having wireless connection capability, or another processing device connected to a wireless modem.

Figure 2:
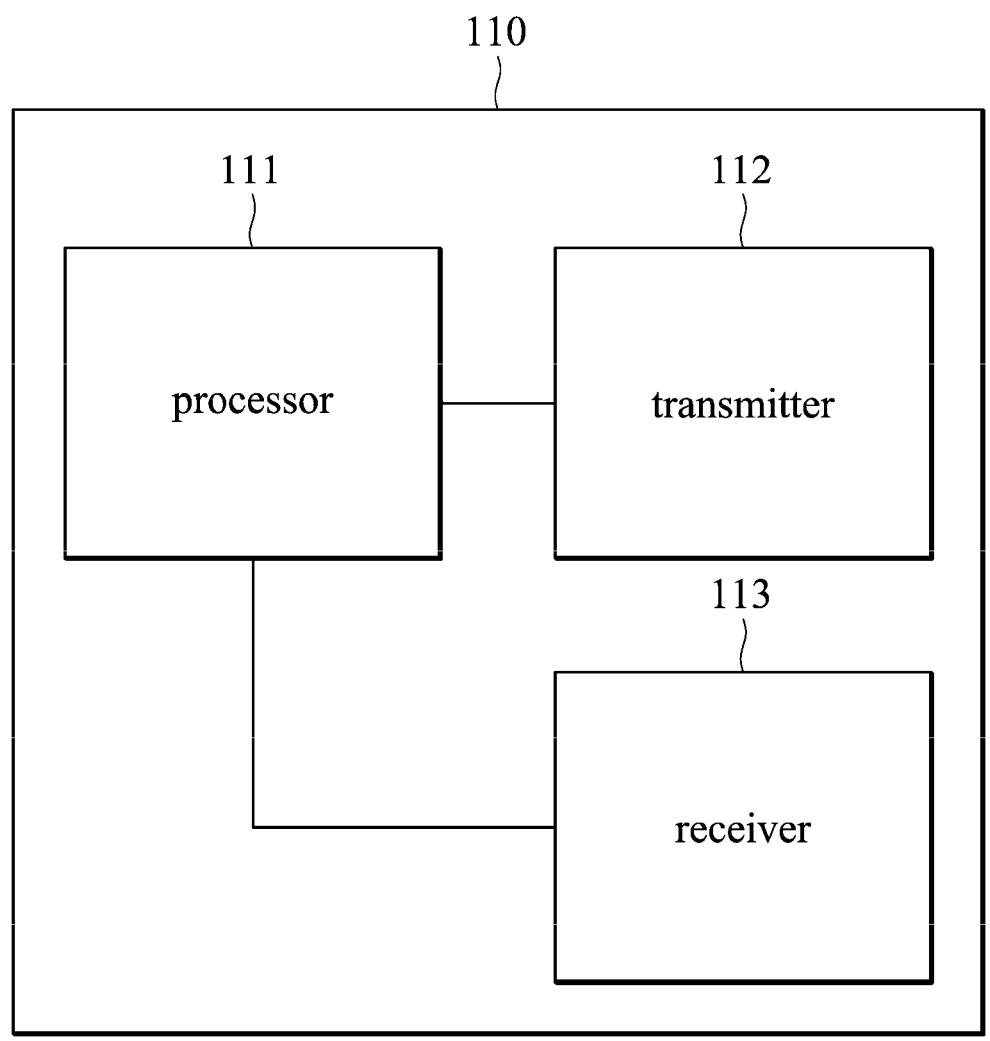
FIG. 2 is a block diagram of MS 110 according to an embodiment of the invention.

FIG. 2 is a block diagram of MS 110 according to an embodiment of the invention. As shown in FIG. 2, the MS 110 includes a processor 111, a transmitter 112 and a receiver 113. The processor 111 may be a general-purpose processor, or a Micro-Control Unit (MCU), or others. The processor 111 is configured to initiate an access attempt and control and execute the functions of the MS 110. The transmitter 112 is configured to transmit a probe to the BS 130, wherein the probe includes the header information and the data frames. The receiver 113 is configured to receive a SACK message from the BS 130. In some embodiments, the MS 110 further includes a memory device (not present). The memory device may be a volatile memory, e.g. a Random Access Memory (RAM), or a non-volatile memory, e.g. a flash memory, Read-Only Memory (ROM), or hard disk, or any combination thereof. Note that, in order to clarify the concept of the invention, FIG. 2 presents a simplified block diagram in which only the elements relevant to the invention are shown. However, the invention should not be limited to what is shown in FIG. 2.

The network 120 operates according to various radio access technologies, such as, for example, LTE, CDMA2000 (e.g., 1x Radio Transmission Technology (RTT), etc.), WiMax, Wireless Local Area Network (WLAN), Universal Mobile Telecommunications System (UMTS), or the like.

The BS 130 may be a fixed station or access network used for communicating with the terminals and may also be referred to as an access point, a Node B, an enhanced base station, an eNodeB (eNB), or some other terminology.

Figure 3:
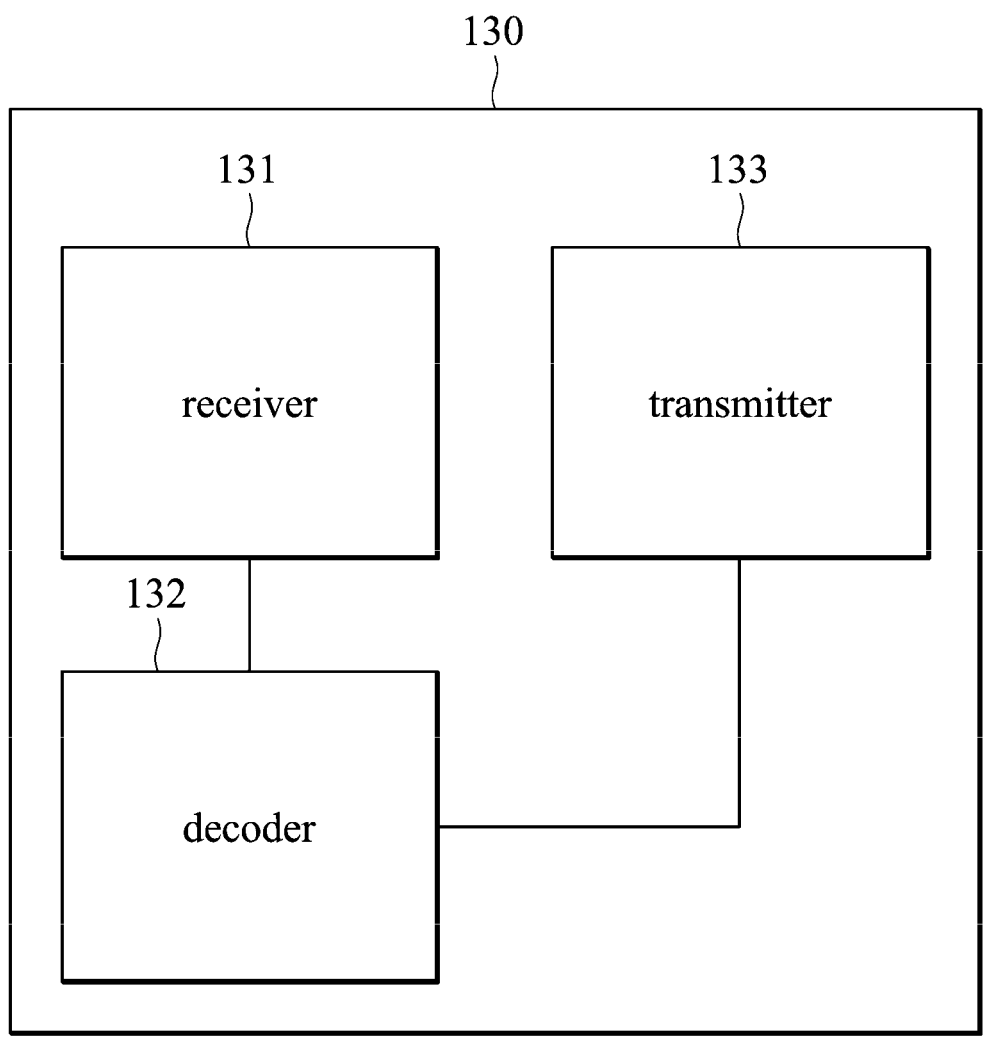
FIG. 3 is a block diagram of BS 130 according to an embodiment of the invention.

FIG. 3 is a block diagram of the BS 130 according to an embodiment of the invention. As shown in FIG. 3 the BS 130 includes a receiver 131, a decoder 132 and a transmitter 133. The receiver 131 is configured to receive a probe from the MS 110, wherein the probe includes header information and data frames. The decoder 132 is configured to decode the header information and the data frames for generating a SACK message. The transmitter 133 is configured to transmit the SACK message to the MS 110. Note that, in order to clarify the concept of the invention, FIG. 3 presents a simplified block diagram in which only the elements relevant to the invention are shown. However, the invention should not be limited to what is shown in FIG. 3.

As shown in FIG. 1, the MS is configured to initiate an access attempt and transmit a probe to the BS, wherein the probe may include the header information and the data frames. The BS decodes header information and data frames for generating a SACK message, after receiving the probe. Then, the MS may detect a Forward Common Assignment Channel (F-CACH) for detecting whether the SACK message is in the F-CACH. If the SACK message is detected in the F-CACH, the MS may transmit the next probe to the BS. If the SACK message is not detected in the F-CACH, the MS may transmit the original probe to the BS again.

In one embodiment, the header information includes a first SACK type header and a second SACK type header. The first SACK type header and the second SACK type header are defined in the MAC layer as Table 1 and Table 2. Table 1 refers to the first SACK type header and Table 2 refers to the second SACK type header.

TABLE 1

| Field | Length (bits) |
| --- | --- |
| SRT_HEADER_ID | 2 |
| MOBILE_ID | 10 |
| SACK_SEQ | 4 |
| RESERVED | As required |

TABLE 2

| Field | Length (bits) |
| --- | --- |
| HEADER_IND | 2 |
| FRAME_NUM | 10 |
| RESERVED | As required |

In the first SACK type header, the SRT_HEADER_ID may be set to 10 to indicate it is first type header. The MOBILE_ID provides a temporary ID for the MS 110, and it is a random number or a hush sequence. The MS 110 may not change this number of the MOBILE_ID in the access attempt. The SACK_SEQ may be a sequence number and it is identified different round of SACK message transmission. The SACK_SEQ may be changed after corresponding SACK message is received. The first SACK type header is transmitted in all of the probes in the access attempt. The second SACK type header is indicated the total number of data frames in the message. In the second SACK type header, HEAD_IND may be set to 11 to indicate that it is the second SACK type header, FRAME_NUM indicates the total number of data frames. In the access attempt, the second SACK type header is transmitted only before any SACK message is received, i.e. if any SACK message is received by the MS 110, the later probes only include the preamble, the first SACK type header and data frames.

In the above embodiment, after initiating an access attempt, the MS 110 transmits a probe to the BS 130, wherein the probe includes a preamble, the first SACK type header, the second SACK type header and the data frames. Then, the BS 130 decodes the first SACK type header, the second SACK type header and the data frames. When the BS 130 has decoded the first SACK type header and the second SACK type header, the BS 130 establishes a buffer for buffering the data frames according to the MOBILE_ID defined in the first type header and generates the SACK message. The SACK message is transmitted to the MS 110 through the F-CACH. In the SACK message, the MSG_TYPE may be set to 010, the MS_ID may be set to the MOBILE_ID of the first SACK type header, the SACK_ID may be set to the SACK_SEQ of the first SACK type header and the SELECTIVE_ACK_BIT_MASK is set according to the decoded data frames. Note that only when both the first SACK type header and the second SACK type header are decoded successfully, the BS may establish a buffer and generate the SACK message. The BS 130 may transmit the SACK message to the MS 110 through the F-CACH. When the MS 110 detects a SACK message with the MS_ID set to the MOBILE_ID, SACK_ID set to the SEC_SEQ, the MS 110 will know that the transmitted probe corresponding to the SACK message has been received by the BS 130. In the next probe, the MS 110 only needs to transmit the preamble, the first SACK type header and the data frames which are selected by the MAC layer according to the SELECTIVE_ACK_BIT_MASK of the SACK message corresponding to the previous probe. In addition, the MS 110 may change the value of the SEC_SEQ. However, if no SACK message is detected by the MS 110 in the F-CACH, the MS 110 may retransmit the original probe with the same content to the BS 130.

In some embodiments, the BS 130 may check the SACK_SEQ from the received probe. If the SACK_SEQ is the same as the SACK_ID of the previous SACK message, the BS 130 may know that the previous SACK message is lost and may retransmit the previous SACK message to the MS 110. If the SACK_SEQ is different from the SACK_ID of the previous SACK message, the BS 130 may know that the previous SACK message has been received successfully by the MS 110 and may generate a new SACK message. After all of the data frames are successfully received by the BS 130, the BS 130 may transmit the data frames in the buffer from the MAC layer to the LAC layer.

In one embodiment, if the MS 110 doesn't detect both the F-PCH and the F-CACH, the additional operation as detailed below is needed. After the BS 130 receives all the data frames successfully, it may transmit the SACK message to the MS 110 to tell the MS 110 that all the data frames have been received. In one embodiment, all the bits of SELECTIVE_ACK_BIT_MASK are set to '1'. And after the SACK message is transmitted, the BS 130 may start a timer $T_{SACK}$. If the MS 110 doesn't receive the SACK message with all the bits of SELECTIVE_ACK_BIT_MASK set to '1', the mobile station may retransmit the previous probe. Otherwise, the mobile station knows that all the data frames have been received successfully. The MS 110 may transmit an indication to LAC layer to indicate that all the data frames have been received successfully. And then, the MS 110 begins to detect the F-PCH. The LAC layer may restart a TA timer. If no acknowledgement is received before TA expires, MS 110 may terminate the access attempt, and initiate a new access attempt. If acknowledgement is received, MS 110 knows that the data frames of layer 2 have been received successfully and may terminate the access attempt. At the BS 130, if it still receives probe before $T_{SACK}$ expires, the BS 130 knows the SACK message with all the bits of SELECTIVE_ACK_BIT_MASK set to '1' is lost. And then, the BS 130 may retransmit the previous SACK message to the MS 110. If no probes are received, the BS 130 knows that the SACK message has been received. And then, the BS 130 may transmit all the buffered data frames to the LAC layer. The LAC layer may do the CRC check to determine whether the PDU is valid. The corresponding acknowledgement is generated through the F-PCH if the PDU is valid. Otherwise, no acknowledgement is generated.

In another embodiment, the header information includes only one header, wherein the header is defined in the MAC layer as Table 3.

TABLE 3

| Field | Length (bits) |
| --- | --- |
| SRT_HEADER_ID | 2 |
| MOBILE_ID | 14 |
| HEADER_EXT (LENGTH_IND) | 2 |
| FRAME_NUM | 10 |
| SACK_SEQ | 4 |
| RESERVED | As required |

In this header, the SRT_HEADER_ID may be set to 10 to indicate that it is the first type header. MOBILE_ID provides a temporary ID for the MS 110, and it is a random number or a hush sequence. The MS 110 may not change this number of the MOBILE_ID in the access attempt. The HEADER_EXT (LENGTH_IND) may be set to 11. The FRAME_NUM indicates the total number of data frames. The SACK_SEQ may be a sequence number and is identified in a different round of SACK message transmissions. The SACK_SEQ may be changed after the corresponding SACK message is received. This header is transmitted in all of the probes in the access attempt. In all probes, the header may be transmitted after the preamble. The header uses the same frame structure as the data frame.

In above embodiment (Table 3), after initiating an access attempt, the MS 110 transmits the header and the data frames to the BS 130. If the data rate is higher than 1.5 kbps, the header is transmitted in one data frame; and if the data rate is 1.5 kbps, the MAC layer assembles the header into two data frames for transmitting. Then, the BS 130 decodes the header and the data frames. When the BS 130 has decoded the header, the BS 130 establishes a buffer for buffering the data frames according to the MOBILE_ID of the header and generates the SACK message. If the data rate is higher than 1.5 kbps, the first data frame is decoded by the BS for generating the SACK message; and if the data rate is 1.5 kbps the first two data frames are decoded by the BS for generating the SACK message. The SACK message is transmitted to the MS 110 through the F-CACH or a paging channel. In the SACK message, the MSG_TYPE may be set to 010, the MS_ID may be set to the MOBILE_ID, the SACK_ID may be set to the SACK_SEQ and the SELECTIVE_ACK_BIT_MASK is set according to the decoded data frames. The BS 130 may transmit the SACK message to the MS 110 through the F-CACH or paging channel. When the MS 110 detects a SACK message with the MS_ID set to the MOBILE_ID, SACK_ID set to the SEC_SEQ, the MS 110 may know that the transmitted probe corresponding to the SACK message has been received by the BS 130. In the next probe, the MS 110 only transmits the header and the data frames which are selected by the MAC layer according to the SELECTIVE_ACK_BIT_MASK of the SACK message corresponding to the previous probe. In addition, the MS 110 may change the value of the SEC_SEQ for indicating that the next round of SACK message transmission has begun. However, if no SACK message is detected by the MS 110 in the F-CACH, the MS 110 may retransmit the original probe with the same content to the BS 130.

In this embodiment, at the MS 110, the MAC layer can tell the LAC layer that one probe is finished. Thus the LAC layer can know the unfinished probe becomes shorter and shorter. Right after the probe transmission is finished, LAC layer can start the TA timer. After transmitting one probe, if there is no SACK message or BSAck message received over the paging channel, the LAC layer will initiate the next probe right after TA timer expires. If the SACK message is received, the TA timer can be stopped and the next probe can be initiated (or if the SACK is received, the next probe is still initiated after the TA timer expires, i.e. it is treated as though no BSAck message was received within the TA timer). If the BSAck message is received before the TA timer expires, the access attempt is terminated.

In another embodiment, if the BS 130 knows the total number of data frames, the header information includes only one header. The header is defined in the MAC layer as Table 4.

TABLE 4

| Field | Length (bits) |
|---|---|
| SRT_HEADER_ID | 2 |
| MOBILE_ID | 11 or 10 |
| SACK_SEQ | 3 or 4 |
| RESERVED | As required |

In the header, the SRT_HEADER_ID is set to 10. In all the probes, the header may be transmitted after the preamble. The header uses the same frame structure as the data frames. Because in this embodiment, the BS 130 knows the total number of data frames, even when the data rate is 1.5 kbps, one frame is still enough to carry the header. The BS 130 may only decode the first data frame to generate the corresponding SACK message.

In another embodiment, the header information includes a first SACK type header and a second SACK type header. The first SACK type header and the second SACK type header are defined in the MAC layer as Table 5 and Table 6. Table 5 is the first SACK type header and Table 6 is the second SACK type header.

TABLE 5

| Field | Length (bits) |
|---|---|
| SRT_HEADER_ID | 2 |
| FRAME_NUM | 10 |
| SACK_CODE | 4 |
| RESERVED | As required |

TABLE 6

| Field | Length (bits) |
|---|---|
| HEADER_IND | 2 |
| MOBILE_ID | 14 |
| RESERVED | As required |

In the first SACK type header, the FRAME_NUM indicates the number of data frames in this probe. In this embodiment, for all the probes, the MS 110 may transmit the preamble, the first SACK type header, the second SACK type header and data frames. The BS 130 may decode the first two data frames to generate the corresponding SACK message.

In another embodiment, the header information (such as mobile station ID and number of data frames) defined in the MAC layer is carried by a special frame structure. In this embodiment, the R-EACH may allow variable data rates for transmission. The MS 110 transmits the (preamble plus special frame structure for the header information) and (preamble plus data frames) to the BS 130. All the data frames may use the same frame structure, but it might be different from the special frame structure for the header.

In another embodiment, the header information includes only one header, wherein the header is defined in the physical layer as Table 7.

TABLE 7

| Field | Length (bits) |
|---|---|
| SRT_HEADER_ID | 2 |
| MOBILE_ID | 11 |
| SACK_SEQ | 3 |
| RESERVED | As required |

In this embodiment, the probes and the SACK message are transmitted in the physical layer. The BS 130 may establish a buffer for buffering the data frames according to the MOBILE_ID defined in the header. If the SACK message has been transmitted through the F-CACH, the physical layer may transmit the header to the MAC layer.

In another embodiment, a Link Access Control (LAC) layer allows the Segmentation and Reassembly (SAR) sublayer to transmit a frame to upper layers. In this embodiment, in BS 130, the physical layer and MAC layer may know how many data frames are enough to get the address information of the MS 110. For each kind of data rate, after the preamble, a certain number of consecutive data frames, which is N, may be successfully decoded, and then be passed to the LAC layer. The N may be determined according to the data rate and the length of the LAC layer (Message length field, ARQ fields, Addressing fields, etc.). The N may be set according to the maximum length of addressing fields. But in some embodiments, the lower layer will not transmit the probe to the LAC layer because the total number of data frames may be smaller than N if the addressing field is short.

Figure 4:
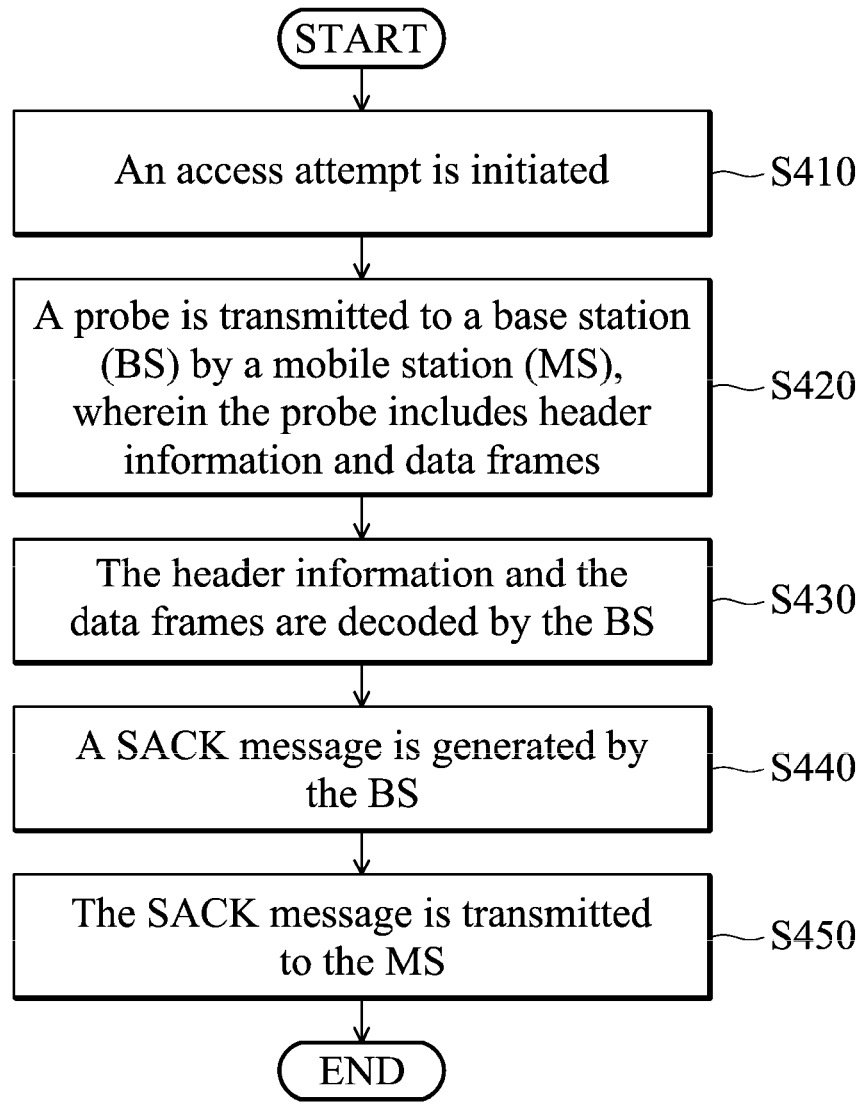
FIG. 4 is a flow chart illustrating a method of data communication for a MAC layer according to an embodiment of the invention.

FIG. 4 is a flow chart illustrating a method of data communication for a MAC layer according to an embodiment of the invention. Firstly, in step S410, an access attempt is initiated. Then, in step S420, a probe is transmitted to a base station (BS) by a mobile station (MS), wherein the probe includes header information and data frames. In step S430, the header information and the data frames are decoded by the BS. In step S440, a SACK message is generated by the BS. In the step S450, the SACK message is transmitted to the MS. In some embodiments, the method further includes the following steps, a Forward Common Assignment Channel (F-CACH) is detected by the MS. If the SACK message is detected in the F-CACH, the next probe may be transmitted by the MS. If the SACK message is not detected in the F-CACH, the probe may be retransmitted again by the MS. In some embodiments, the header information includes a first type header and a second type header. In some embodiments, the header information includes one header. The different header schemes are described in detail in the above embodiments.

In the current SACK operation, in the lower data rate situation, the upper layer in the BS side doesn't know how many R-EACH data frames are transmitted in the probe, because the first data frame may not be enough to carry the message length and mobile station address information. Therefore, in the method, the BS may know how many frames are enough to get the message length and address information according to the header information from the MS, and the corresponding SACK message may be transmitted to the MS. Therefore, the method may reduce and solve the above problems and make efficient use of transmission resources.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method of data communication for a media access control (MAC) layer, including:
   Initiating, by a mobile station (MS), an access attempt;
   transmitting a probe to a base station (BS), wherein the probe includes a preamble, header information and data frames;
   decoding the header information and the data frames;
   generating, by the BS, a selective acknowledgement (SACK) message; and
   transmitting the SACK message to the MS,
   wherein the header information includes a first type header and a second type header, the BS establishes a buffer according to a MOBILE_ID defined in the first type header and generates the SACK message after both of the first type header and the second type header are decoded.

2. The method of claim 1, further including:
   detecting by the MS a Forward Common Assignment Channel (F-CACH);
   transmitting a next probe when the SACK message is detected in the F-CACH; and
   retransmitting the probe again when the SACK message is not detected in the F-CACH.

3. The method of claim 1, wherein in the SACK message comprising the MOBILE_ID, a SACK_SEQ set according to a SACK_ID and a SELECTIVE_ACK_BIT_MASK set according to the decoded data frames.

4. The method of claim 3, wherein a next probe comprising the first type header and data frames selected by the MAC layer according to the SELECTIVE_ACK_BIT_MASK, and wherein the SACK_SEQ in the first type header is changed by the MS, the BS determines whether to generate a new SACK message according to the SACK_SEQ in the first type header.

5. The method of claim 1, wherein the header information uses the same frame structure as the data frames, and the SACK message is transmitted through a paging channel.

6. A method of data communication for a media access control (MAC) layer, including:
   Initiating, by a mobile station (MS), an access attempt;
   transmitting a probe to a base station (BS), wherein the probe includes a preamble, header information and data frames;
   decoding the header information and the data frames;
   generating, by the BS, a selective acknowledgement (SACK) message; and
   transmitting the SACK message to the MS, wherein when a data rate is higher than a threshold, a header is transmitted in one data frame, a first data frame is decoded by the BS for generating the SACK message; and when the data rate is lower than the threshold, the MAC layer assembles the header into two data frames for transmitting, the two data frames are decoded by the BS for generating the SACK message.

7. The method of claim 6, wherein when the BS receives a total number of the data frames, the header information includes one type header transmitted in one data frame and a data rate is the threshold.

8. A mobile station (MS), connecting with a base station (BS), the MS comprising:
   a processor, configured to initiate an access attempt;
   a transmitter, configured to transmit a probe to the BS, wherein the probe includes a preamble, header information and data frames; and
   a receiver, configured to receive a selective acknowledgement (SACK) message from the BS,
   wherein the header information includes a first type header and a second type header, the SACK message comprising a MOBILE_ID, a SACK_SEQ set according to a SACK_ID and a SELECTIVE_ACK_BIT_MASK set according to decoded data frames.

9. The MS of claim 8, wherein the receiver detects a Forward Common Assignment Channel (F-CACH); the transmitter transmits a next probe when the SACK message is detected in the F-CACH; and the transmitter retransmits the probe again when the SACK message is not detected in the F-CACH.

10. The MS of claim 8, wherein a next probe comprising the first type header and data frames selected by a media access control (MAC) layer according to the SELECTIVE_ACK_BIT_MASK, and wherein the SACK_SEQ in the first type header is changed by the MS, the base station determines whether to generate a new SACK message according to the SACK_SEQ in the first type header.

11. A mobile station (MS), connecting with a base station (BS), the MS comprising:
   a processor, configured to initiate an access attempt;
   a transmitter, configured to transmit a probe to the BS, wherein the probe includes a preamble, header information and data frames; and
   a receiver, configured to receive a selective acknowledgement (SACK) message from the BS, wherein when a data rate is higher than a threshold, a header is transmitted in one data frame, a first data frame is decoded by the BS for generating the SACK message; and when the data rate is lower than the threshold, a media access control (MAC) layer assembles the header into two data frames for transmitting, the two data frames are decoded by the BS for generating the SACK message.

12. The MS of claim 8, wherein the header information uses the same frame structure as the data frames, and the SACK message is transmitted through a paging channel.

13. A base station (BS), comprising:
- a receiver, configured to receive a probe from a mobile station (MS), wherein the probe includes a preamble, header information and data frames;
- a decoder, configured to decode the header information and the data frames for generating a selective acknowledgement (SACK) message; and
- a transmitter, transmitting the SACK message to the MS, wherein the header information includes a first type header and a second type header, the BS establishes a buffer according to a MOBILE_ID defined in the first type header and generates the SACK message after both of the first type header and the second type header are decoded.

14. The BS of claim 13, wherein in the SACK message comprising a MOBILE_ID, a SACK_SEQ set according to a SACK_ID and a SELECTIVE_ACK_BIT_MASK set according to the decoded data frames.

15. The BS of claim 13, wherein the header information uses the same frame structure as the data frames, and the SACK message is transmitted through a paging channel.

16. The BS of claim 14, wherein a next probe comprising the first type header and data frames selected by a media access control (MAC) layer according to the SELECTIVE_ACK_BIT_MASK.

17. A base station (BS), comprising:
- a receiver, configured to receive a probe from a mobile station (MS), wherein the probe includes a preamble, header information and data frames;
- a decoder, configured to decode the header information and the data frames for generating a selective acknowledgement (SACK) message; and
- a transmitter, transmitting the SACK message to the MS, wherein when a data rate is higher than a threshold, a header is transmitted in one data frame, a first data frame is decoded by the BS for generating the SACK message; and when the data rate is lower than the threshold, a media access control (MAC) layer assembles the header into two data frames for transmitting, the two data frames are decoded by the BS for generating the SACK message.

18. The BS of claim 17, wherein when the BS receives a total number of the data frames, the header information includes one type header transmitted in one data frame and a data rate is the threshold.

* * * * *